UNITED STATES PATENT OFFICE.

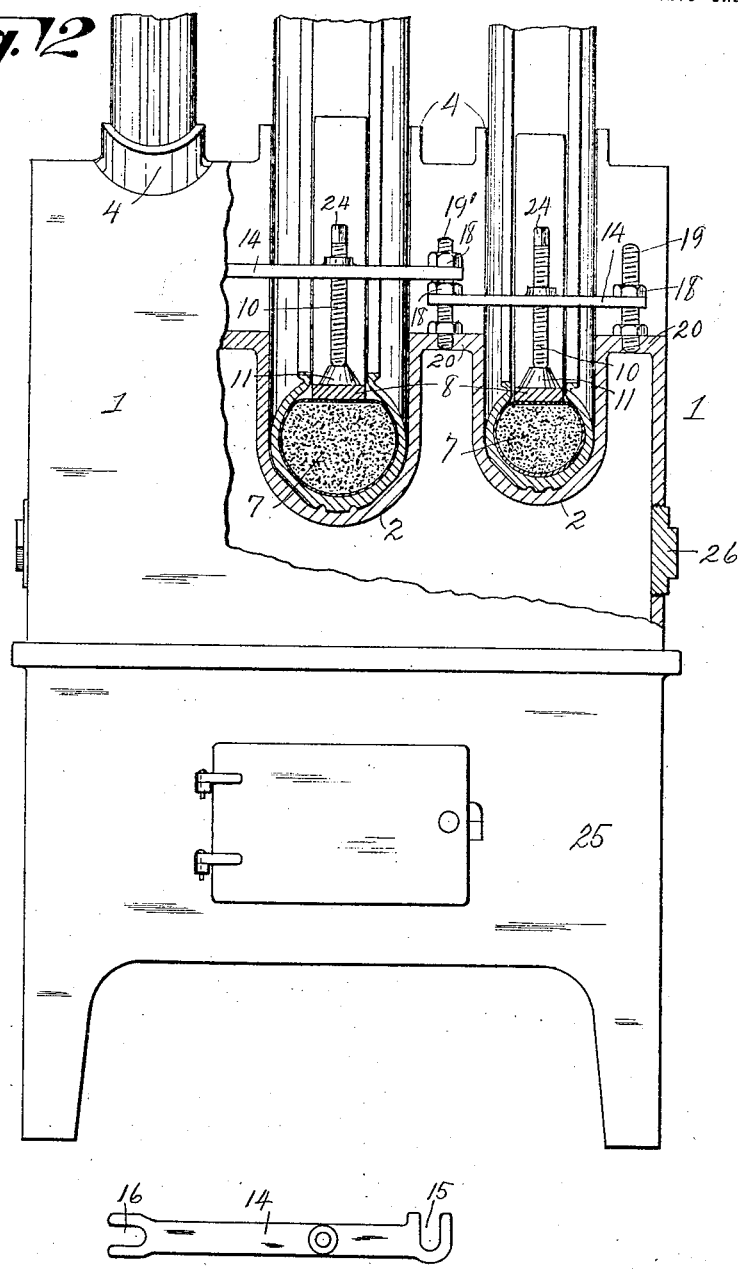

ARTHUR B. ZWEBELL, OF MILWAUKEE, WISCONSIN.

VULCANIZER.

1,337,631.

Specification of Letters Patent.  Patented Apr. 20, 1920.

Application filed September 16, 1918. Serial No. 254,247.

*To all whom it may concern:*

Be it known that I, ARTHUR B. ZWEBELL, a citizen of the United States, residing at Milwaukee, county of Milwaukee, and State of Wisconsin, have invented new and useful Improvements in Vulcanizers, of which the following is a specification.

My invention relates to improvements in vulcanizers.

The object of my invention is to provide an improved repair outfit adapted for use particularly in re-treading tire casings. More particularly, my object is to provide means whereby a gang or set of such repair outfits may be operated as a single apparatus and a number of tire casings repaired at once without interfering with the work of removal and replacement of any one casing, although the same anchor posts are used in some instances to receive the screw seat plates of two casings.

In the drawings,—

Fig. 2 is an end elevation, partially broken away in vertical section.

Fig. 3 is a detail view of one of the screw seat plates.

The several parts are identified by the same reference characters throughout the several views.

Figure 1:
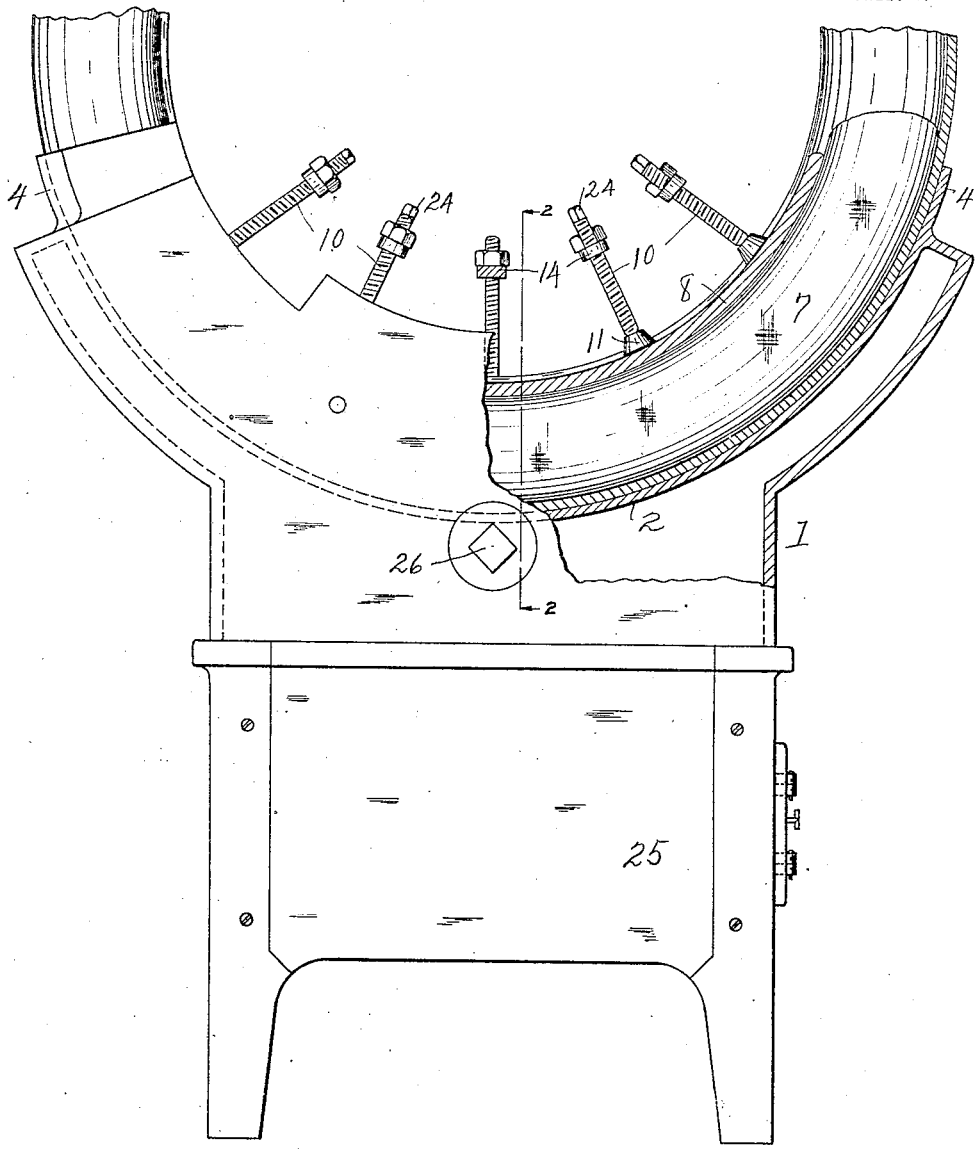
Figure 1 is a side elevation of a repair outfit embodying my invention, with a portion broken away to show the arcuate seating for one of the tire casings, and the extension thereof for overlapping vulcanization of the tread surfaces at the meeting points of successive operations on the same casing.

The main casting 1 is a hollow chamber having arcuate seatings 2 in its upper surface, preferably of differing cross diameters, whereby they may receive casings of differing standard sizes. At each end of these arcuate seatings the casing wall is extended in the form of curved flanges 4, these flanges being integral cast metal extensions of about one-half inch in thickness, and having a curvature corresponding to the curvature of the seatings, and constituting extensions thereof to carry a portion of the heat upwardly and partially vulcanize the rubber which these flanges cover.

In the construction illustrated, the arcuate seatings are adapted to receive about one-third of the periphery of the tire casing for which they are intended, or slightly less than one-third thereof. After the vulcanizing operation, the tire is removed and subsequently replaced after having been partially rotated so as to present the next third of its peripheral surface to the seating, one of the flanges 4 over-lapping the surface previously covered by a flange 4, and thus subjecting this portion of the casing to a longer but much slower vulcanizing operation than that which takes place within the seating proper.

I am aware of the fact that extension flanges, either integral or otherwise, have heretofore been provided for the purpose of preventing the formation of a transverse seam or rib across the face of the rubber, but I believe it has heretofore been the practice to use a thin flange for this purpose which would not carry sufficient heat to vulcanize the rubber which it inclosed. I believe I am the first to provide a cast metal flange integral with the chamber, and of such thickness as to effect a semi-vulcanization of the rubber during the same time as that required for complete vulcanization of that portion of the casing which is within the seatings, and therefore more directly exposed to heat conduction through the walls of the chamber 1. By my improvement I am able to entirely avoid the production of a cross seam, and to also secure a substantially uniform vulcanization of the tire throughout its entire circumference by having the flanges 4 applied twice to that portion of the surface which they cover, and by having the flanges of such thickness as to convey the proper amount of heat to this portion of the tread surface to complete vulcanization thereof in approximately twice the time required for the vulcanization of the other portions. For example, a temperature of between 240° F. and 250° F. in the flanges will accomplish substantially the same result in twice the time that will be accomplished by a temperature of 270° F. to 280° F. in the arcuate seatings. These figures, however, are only approximate, since the temperature of the flanges may be between 250° F. and 260° F., and that of the arcuate seatings may range from 280° F. to 290° F. if desired, the exact temperature necessary to secure the best results being dependent quite largely upon the character of the rubber used, and the proportionate quantity of sulfur content.

The portion of the casing which is being vulcanized is temporarily filled with a sand bag 7, to the inner surface of which an arcuate clamping member 8 is applied, the latter being curved longitudinally, in general conformity with the curvature of the casing. Pressure is applied to these arcuate clamping members 8 at intervals throughout their length by means of clamping set screws 10 having swivel heads 11 adapted to bear upon the curved members 8. The clamping set screws have threaded bearings in elongated plates or bars 14 which constitute screw seat plates. Each of these plates has laterally projecting fork arms 15 at one end, and longitudinally projecting fork arms 16 at the other end, these fork arms being adapted to engage underneath the nuts 18 mounted on threaded anchor posts 19 projecting upwardly from benches 20 located at the sides of the respective arcuate seatings 2 in the upper surface of the chamber 1. These anchor posts, particularly the intermediate anchor post 19', may carry a plurality of nuts 18, spaced apart, and adapted to receive the fork arms 15 or 16 underneath them, said forked arms straddling the anchor posts. The seat plates 14 may be very readily adjusted in position by retracting the clamping set screws 10, adjusting one of the forked ends underneath the appropriate nut on one anchor post, and then swinging the plate to cause the other fork arms 15 to engage underneath the nut on the other anchor post. The anchor posts 19, 19' are spaced apart at a distance equal to the length of plates 14 between the forks, and in the construction shown, the anchor plates 14 may be conveniently arranged with those plates which cross the outer seatings disposed with their inner ends engaging the associated anchor posts between the outer seating and the middle seating, and underneath the ends of the central set of plates which engage the same set of anchor posts.

The clamping screws 10 are preferably provided with squared upper ends 24 to facilitate their manipulation by means of a rotary tool.

A stand 25 containing a heater of any desired type will preferably be employed to support the chamber 1. The chamber itself will preferably be filled with water, wholly or partially. Suitable plugs 26 afford access to the interior. Any suitable means may be employed to determine the temperature of the interior, as in any ordinary steam or water heated vulcanizers. The chamber may, of course, be filled with oil or any other liquid, if desired.

In operation, the casings to be vulcanized along their tread surfaces are first prepared and coated with prepared rubber. Each casing thus coated over the required extent of surface is thereupon placed within an arcuate seating member. the diameter of which conforms with that of the casing. A sand bag is thereupon placed within the casing, and a clamping plate 8 applied thereto, after which the anchor plates 14 are adjusted to the anchor posts 19 underneath the nuts 18 thereon at each side of the seating. The nuts 18 having been adjusted at the desired level, the clamping screws 10 will, of course, be carried into position with the plates 14, and these screws will then be turned downwardly to apply clamping pressure to the plates 8, the nuts 18 resisting upward movement of the anchor plates 14. Owing to the forked extremities of the anchor plates, it is obvious that it will be immaterial whether the central casing be first applied to its seating, or whether one be applied first at either side of the center. It will also be obvious that any desired number of seatings may be provided, although it facilitates the removal and the replacement of casings to provide three seatings for each chamber, access then being easy to all the clamping screws from either side.

It will be observed that all the clamping set screws point toward the center of the circle in which the arcuate seatings curve. Each screw may be adjusted independently, and the pressure may therefore be regulated as desired. By employing five or more screws for each clamping plate 8 substantially uniform pressure may be exerted upon the sand bag throughout the length of the seating. The sand bag is, of course, employed to transmit the pressure to the portion of the casing which is being vulcanized.

It will be understood that the effect of the flanges 4 upon the rubber progressively decreases, as the temperature decreases, toward the outer ends of the flanges, the extremities causing little, if any, vulcanization. But when the tire casing is readjusted in the seating to vulcanize the next third portion thereof, the flange at the other end of the seating will overlap this partially vulcanized portion in the opposite direction, thereby serving as a perfect complement, whereby complete vulcanization of this portion of the casing is effected. The final readjustment of the casing in the seating brings the casing to a position where both flanges overlap partially vulcanized portions of the tread surface, thus completing the work throughout the area of such surface.

I claim:—

1. A repair vulcanizer, including the combination of a heating chamber provided with a plurality of arcuate seatings in its upper surface, radially disposed anchor posts connected with said chamber at each side of each of the seatings, and provided with adjustable nuts, a set of anchor plates having forked ends adapted to be manipulated into engagement with the posts underneath said nuts, in positions transverse to the respective seatings, a series of radially disposed clamping set screws for each seating, each threaded in one of the anchor plates, an arcuate clamping plate for each seating adapted to fit within the tire casing, and against which said set screws bear, and a sand bag associated with each clamping plate, and adapted to be interposed between it and a tire casing mounted within the corresponding seating, whereby the set screws may be separately adjusted to apply the desired pressure to its casing through the portion of the sand bag directly affected thereby, and different pressures may be applied to different portions of the sand bag.

2. In a repair vulcanizer, the combination with a heating chamber, having an arcuate seating, and provided with radially disposed sets of clamping posts, arranged in pairs on opposite sides of the seating, adjusting nuts on said posts, anchor plates, spanning the space above the seating, and adapted to engage the posts underneath the nuts, said plates having longitudinally extending post receiving fork arms at one end, and laterally extending post receiving fork arms at the other end, a clamping set screw having threaded engagement with the central portion of each anchor plate, and an arcuate clamping plate adapted to receive the pressure of all of the set screws in the series, whereby each set screw may be independently adjusted to exert the desired pressure upon the clamping plate.

3. In a repair vulcanizer, the combination of a casing provided with a plurality of arcuate seatings, radially disposed sets of anchor posts secured to the upper surface of the casing at the sides of the seatings, and between the seatings, a plurality of nuts adjustably secured to the sets of posts between the seatings, sets of anchor plates transversely spanning the space above the seatings, and provided with forked ends loosely engaging the anchor posts underneath said nuts, and clamping set screws carried by said anchor plates, one of the nuts on each intermediate row of anchor posts being adapted to support one anchor plate against the reaction pressure of the set screw, and means for applying the pressure of the set screws to tire casings mounted in said seatings.

In testimony whereof I affix my signature in the presence of a witness.

ARTHUR B. ZWEBELL.

Witness:
  O. C. WEBER.